United States Patent

Tagawa et al.

[15] 3,706,979

[45] Dec. 19, 1972

[54] CASSETTE DRIVEN BY EITHER VACUUM BINS OR PINCH ROLLERS

[72] Inventors: James M. Tagawa; Hui-li Tiao, both of Boulder, Colo.

[73] Assignee: International Business Machines Corporation, Armonk, N.Y.

[22] Filed: April 23, 1971

[21] Appl. No.: 136,674

[52] U.S. Cl...340/174.1 C, 179/100.2 Z, 242/55.13, 274/4 D

[51] Int. Cl. ..........................B65h 17/0, G11b 15/26

[58] Field of Search .........340/174.1 C; 179/100.2 Z; 274/4 C, 4 D, 4 F; 242/55.13

[56] References Cited

UNITED STATES PATENTS

| | | | |
|---|---|---|---|
| 3,235,264 | 2/1966 | Mikrut | 179/100.2 Z |
| 3,126,163 | 3/1964 | Knox | 179/100.2 Z |
| 3,229,927 | 1/1966 | Cohler | 179/100.2 Z |

OTHER PUBLICATIONS

"Tape Cartridge", Johnson et al., IBM ech. Disc. ul. Vol. 9 No. 6, 11/66.

"Magnetic Tape Cartridge", heppley, Jr., IBM ech. Disc. ul. Vol. 8 No. 10, 3/66.

*Primary Examiner*—Vincent P. Canney

*Attorney*—Hanifin & Jancin and Herbert F. Somermeyer

[57] ABSTRACT

A data processing system uses a tape-containing cassette for interchange between low-speed recording systems and high-speed or high-performance recording systems. In a low-performance system, the tape is transported wholly within the cassette. The cassette may be removed from a low-performance player and placed in a high-performance player. Then, the tape is partially removed from the cassette for higher speed transport. Modifying the front end of the cassette enables it to be placed either in the low-performance or high-performance unit enabling upward and downward compatibility. Modifications of the front end may be either manual or aoutomatic.

9 Claims, 5 Drawing Figures

CASSETTE DRIVEN BY EITHER VACUUM BINS OR PINCH ROLLERS

BACKGROUND OF THE INVENTION

The present invention relates to data processing systems employing magnetic record containing cassettes and particularly to those systems employing cassettes having upward and downward performance compatibility.

The data processing industry, for years, has used magnetic tape as a memory media. Many tape recording systems use half-inch tape stored on a spool containing 500 to 2400 feet of such tape. Even though such reels are usable on drives of various performance, these reels of tape are quite heavy. As such, they are not easily automatically transported or stored. Also, the cost of the mechanisms used to record and reproduce from such tapes is quite expensive. As such, half-inch tape systems have been limited to the more expensive data processing systems and usually have been excluded from those portions of data processing systems utilizing communications networks, such as telephone systems for intercommunications.

In parallel to the growth of the data processing industry, the entertainment field, i.e., audio, video, and the like, has produced tape containing cassettes or cartridges which are interchangeable among a large plurality of relatively low-speed cassette players. By low-speed is meant less than 50 inches per second of tape velocity. Recently, such cassettes and cartridges have been adapted to digital recording. Again, such cassettes have been useful only with relatively low-speed cassette players. Such an arrangement is satisfactory as long as the data transfer rate of the connected system remains relatively low. However, in a data collection system, this is not always the case; and, therefore, the present digital cassettes and digital cassette players do not meet all of the operational requirements of a large data collection system.

On the other hand, it has been well known that the use of vacuum buffers and the like is important for transporting webs at high speeds for use in data processing operations. Some systems, such as those shown by Bilsback U.S. Pat. No. 2,941,741, show a cassette having an openable cover for partially removing record tape therefrom for high-speed data processing in a vacuum column type of tape transport. If such a cartridge were used on a low-speed device, the cost of the transport would be unnecessarily high. Therefore, there are conflicting requirements for high-speed transport and low-speed tape transport with respect to tape in a cartridge.

SUMMARY OF THE INVENTION

It is an object of the present invention to provide a system and an improved tape containing cassette adaptable for both low-speed and high-speed operations and for minimizing cost of the respective cassette players.

It is another object to provide methods of operation in connection with such apparatus as set forth in the first-listed object.

A cassette incorporating the teaching of the present invention has an internal tape path along which tape may be transported for transducing operations. The tape path extends along one longitudinal wall of the cassette with that wall having openings for receiving a magnetic head, pinch roller, and the like, for effecting transducing operations with respect to the tape within the cassette.

The front wall further is removably disposed such that the whole length of tape extending therealong may be exposed for removal from the cassette for transducing operations external to the cassette. Preferably, the front wall is replaceable.

In a preferred form of the invention, the front wall consists of a hinged plate having apertures for receiving a pinch roller and record head, respectively. In a second form of the invention, the cover is two end plates hinged at opposing corners of the cassette for pivoting motion between closing and opening positions. Detent latching may be provided for the end plates.

A system using the above-described cassette may have two types of cassette players. One receives the cassette with the removable front wall closing the front end portion and adapted to receive a transducing head and a pinch roller for tape engagement through the apertures. A second machine may have a pair of buffer vacuum columns for receiving a portion of the tape in the cassette for high-speed tape transducing operations. Other forms of media buffering may be used. Alternately, a closely controlled reel-to-reel servo system may be used. The just-described machines may include automatic means for opening and closing the front wall in accordance with the type of operation desired for the particular machine.

The foregoing and other objects, features, and advantages of the invention will be apparent from the following more particular description of the preferred embodiment of the invention, as illustrated in the accompanying drawings.

THE DRAWINGS

DETAILED DESCRIPTION

Figures 1, 2:
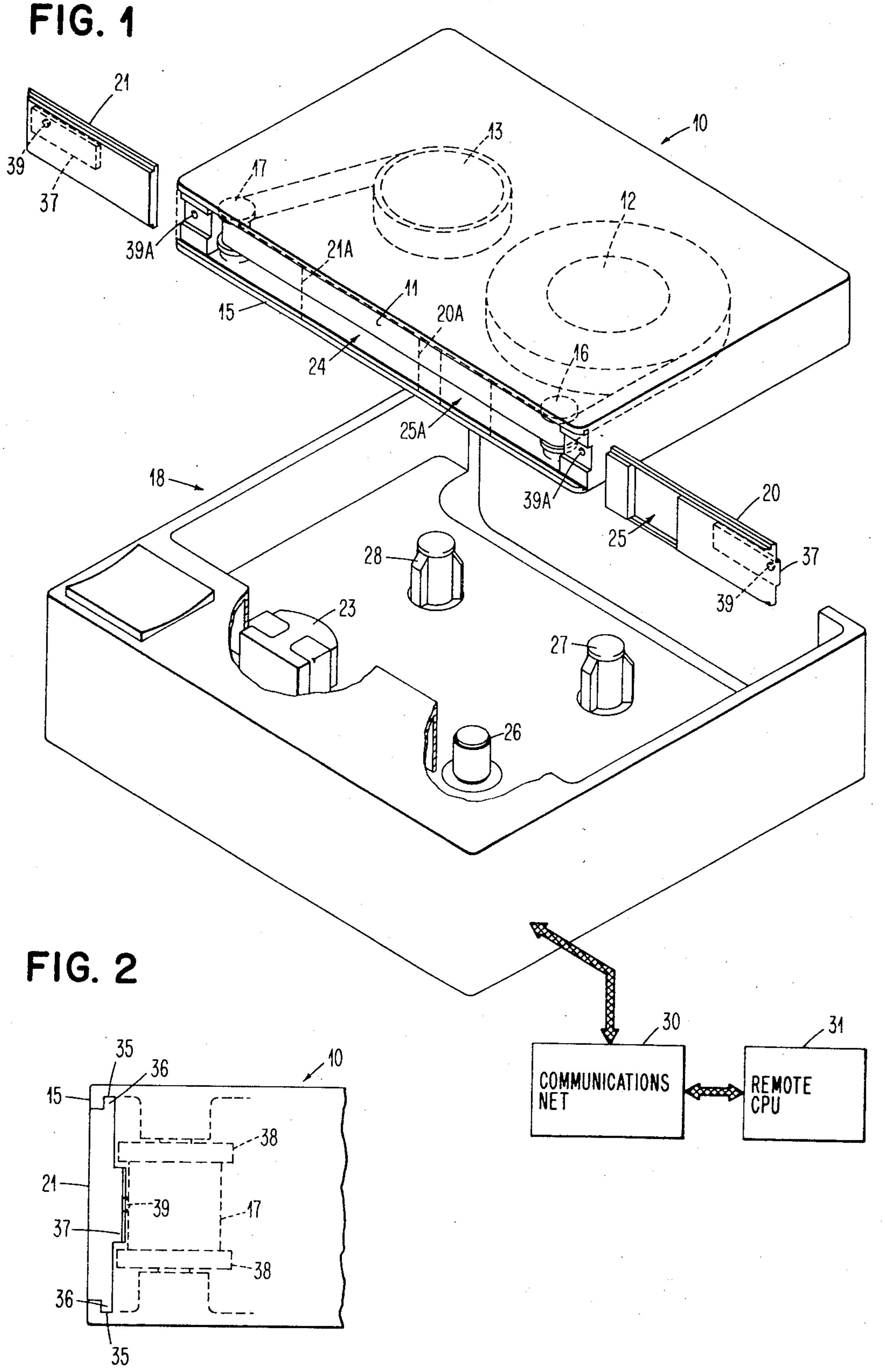
FIG. 1 is a simplified isometric diagrammatic view of a cassette constructed in accordance with the teaching of the present invention disposed above a cassette player adapted for transducing operations with tape in the cassette and with the front wall end plates removed for illustrating the relationships thereof to the cassette.
FIG. 2 is a simplified diagrammatic showing of an end plate disposed within the cassette.

Referring now more particularly to the drawings, like numerals indicate like parts and structural features. Cassette or cartridge 10 contains tape 11 wound on a pair of spools 12 and 13. Along front end wall portion 15 of cassette 10, tape 11 is movingly disposed between a pair of flanged idler rollers 16 and 17. When cassette 10 is used in low-speed cassette player 18, the pair of front wall end plates 20 and 21 partially close front end wall portion 15 as shown by dotted lines 20A and 21A.

Figures 3, 4, 5:
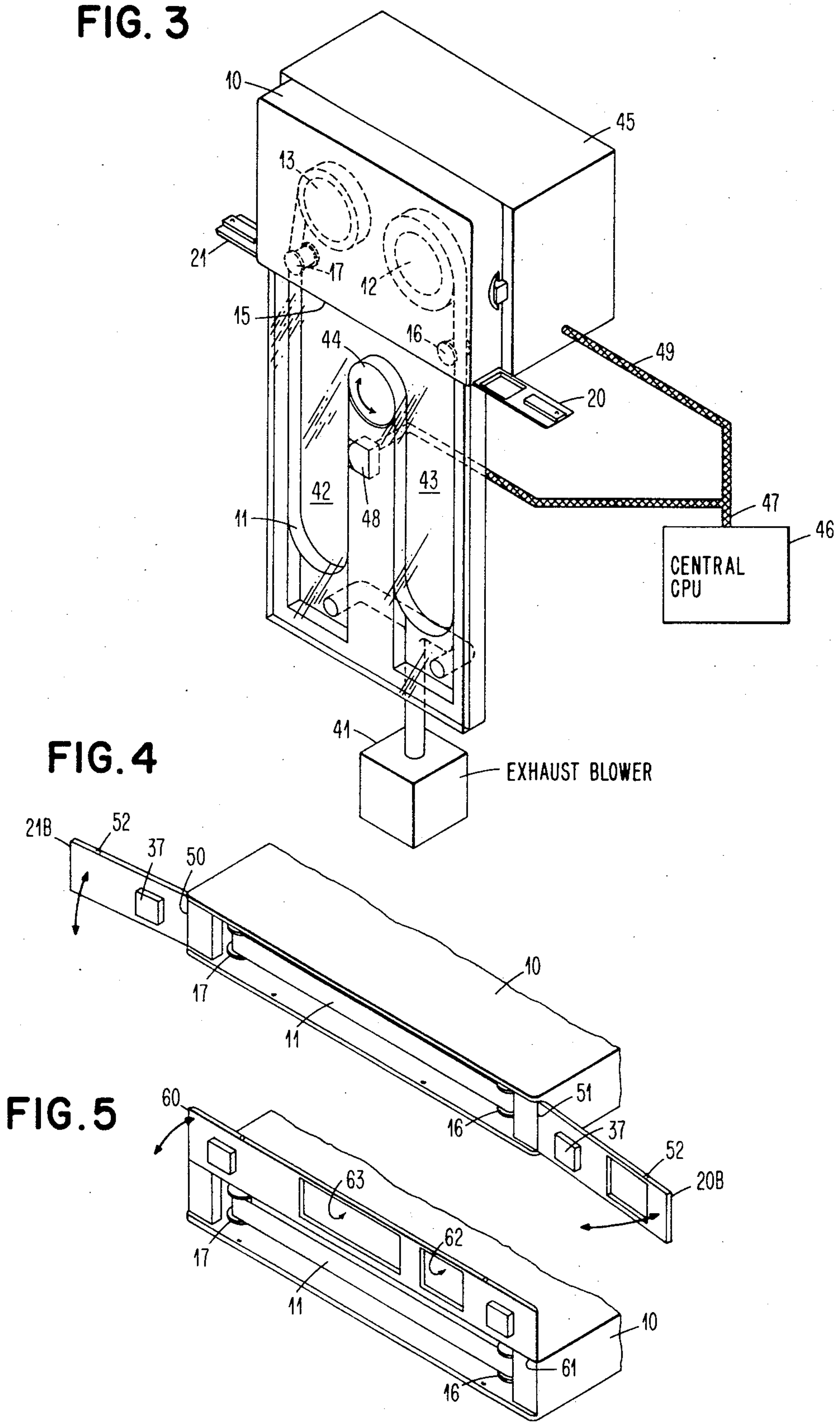
FIG. 3 is a diagrammatic showing of a data processing system utilizing the illustrated cassette with a vacuum column type of tape transport.
FIG. 4 is a diagrammatic showing of a modification of the FIG. 1 cassette in that the end plates are hinged at the cassette corners for pivoting motion between closing and opening positions.
FIG. 5 shows a cassette with the front wall hinged along one longitudinal edge of the cassette.

With the front wall 20, 21 removed, cassette 10 is usable in the FIG. 3 illustrated player as later described.

Front wall end plates 20 and 21 in the closed dotted line position protect tape 11 from snagging and tearing during insertion and ejection from player 18. End plates 20 and 21 are spaced apart to form transducer 23 receiving aperture 24 such that transducing operations can be effected on tape 11 while being transported within cassette 10. Aperture 25, shown in operating position at 25A, receives a pinch roller (not shown) in player 18 which presses tape 11 against continuously rotating capstan 26 insertable into cassette 10 through an aperture (not shown) in a lower broadside wall. Player 18 has a pair of reel drive spindles 27 and 28 engagable with reels 12 and 13 for rotating same in a known manner.

As shown in FIG. 1, player 18 is a communications terminal for communications net 30 connected to remote central processing unit (CPU) 31. Net 30 permits only a relatively slow data rate (2500 Hz bandwidth, for example); therefore, player 18 transports tape 11 at a relatively low velocity past transducer 23 in coordinated relationship with data signals exchanged over communication net 30.

The relationship of front wall end plates 20 and 21 to the cassette is best seen by inspection of FIG. 2, showing end plate 21. Front wall portion 15 of cassette 10 has a pair of facing grooves 35 which slidably receive outwardly extending shoulders 36 on plate 21. In the center portion of plate 21, depending tape guide projection 37 inwardly extends between the outer peripheral extent of the flanges 38 on idler roller 17. Tape 11 extends between projection 37, flanges 38, and the hub portion of idler 17. This arrangement retains tape 11 between flanges 38 during rapid acceleration and deceleration of tape. The construction with respect to plate 20 and idler 16 is the same as that shown for plate 21 in FIG. 2.

Cassette 10 is also used with high-speed transport 40 (100,000 Hz or greater bandwidth, for example) shown in FIG. 3. Transport 40 has a mechanism (not shown) for retracting end plates 20 and 21 to the illustrated position beyond the outer extent of the tape path defined by idlers 16 and 17. Tape 11 is then fully exposed along front end wall portion 15. Tape 11 is partially withdrawn from cassette 10 through vacuum urging of exhaust blower 41 into a pair of vacuum bins or columns 42 and 43. Such a partial unloading of the tape from the cassette is shown by R. A. Barbeau in the IBM TECHNICAL DISCLOSURE BULLETIN article entitled "Automatic Tape Loading and Unloading" in Volume 4, Number 12, dated May 1962, on pages 31 and 32, and also is referred to in the Bilsback patent, supra. For this reason, the loading and unloading of tape 11 to and from cassette 10 is not further described.

Transport 40 has single capstan 44 for transporting tape between vacuum columns 42 and 43. Tape transport control 45 includes a pair of reel drive motors (not shown) and associated control circuits for selectively rotating reels 12 and 13 in coordinated action with capstan 44 as is well known in the data processing tape transport art.

Central CPU 46 has data exchanging cable 47 connected to transducer or head 48 disposed between vacuum columns 42 and 43. Control signals are exchanged between control 45 and CPU 46 over cable 49. Operation of the transport 40 is not further described as it follows known data processing techniques.

Tape transport 18 and tape transport 40 can be located within the same room for facilitating exchanging cartridge 10 therebetween. For example, a portion of the room may be assigned as a communications terminal. Player 18 is located within the terminal; and through either a stacker or other form of automatic library systems, many of which are known, one or more cassettes 10 may be used to exchange data signals with remote CPU 31. Upon completion of data exchanging, the cassettes are removed from the communication terminal portion and taken physically to the data processing portion which includes transport 40. A library system, such as described in the Burke et al. U.S. Pats. No. 2,941,738 and No. 2,941,739, may be used for loading and unloading cassette 10 in transport 40. Alternatively, manual loading and unloading may be used. Also, a common library system may be used for connecting the communication terminal cassette player 18 to transport 40, the cassettes being automatically loaded and unloaded from the various cassette players of differing performance in accordance with instructions from a central CPU 46. In that instance, end plates 20 and 21 and the associated apparatus should be fully automatically operated. Details of such automatic operation can take several known forms.

FIG. 4 shows a second embodiment of the cassette 10 wherein end plates 20B and 21B are hingedly secured at corners 50 and 51 of cassette 10. Idler rollers 16 and 17 are constructed identically with inwardly extending tape guide projection 37 being formed on the inner side of the hinged end plates 21B and 20B. A set of detents 52 are inwardly formed in the outer end portions of the hinged end plates.

FIG. 5 shows a third cassette front wall arrangement. Cassette 10 has tape 11 threaded over idlers 16 and 17 as previously described. Front wall 60 is hinged to cassette 10 along front upper edge 61 for pivoting between closed (in-the-cassette tape handling) and open (out-of-cassette tape handling), as shown. The hinge can be integrally formed in wall 60 and cassette 10 or may be a metal hinge riveted, bolted, or molded in place to wall 60 and cassette 10. Suitable detents (not shown) are provided to ensure wall 60 is retained in the closed position. Front wall 60 has apertures 62 and 63 respectively receiving a pinch roller and head for in-the-cassette transducing operations.

Other removable front walls may have different aperture configurations to accommodate various transport design choices. Additionally, other techniques of releasably retaining front wall 60 may be used.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A data processing system including first and second cassette tape players, the first cassette player operable only with cassettes having a given outline dimension and shape for transducing operations within the cassette and said second player operable only with cassettes having said given outline dimension and shape having tape at least partially removable from the cassette for transducing operations outside the cassette, the improvement including in combination:

a cassette having said given outline dimension and shape usable in said system including a record tape and a tape holder within the cassette, means defining a tape within said cassette at least along a front wall portion for transducing operations, and removable front wall means on said cassette adapted to partially close said front wall portion for retaining the tape in said cassette when closed and permitting access to said tape through uncovered portions for facilitating transducing operations with said first tape player and removable for exposing substantially all of said front wall portion whereby a portion of said tape may be removed therethrough with said tape leaving said cassette at opposite ends of said end wall portion for facilitating transducing operations with said second tape player.

2. The system set forth in claim 1 wherein said cassette includes a pair of idler rollers at respective opposite ends of said one end wall portion for defining a tape path therebetween within the cassette for facilitating transducing operations with said first tape player and for defining a tape path whereby the tape can leave the cassette when said end wall closures have opened substantially all of said one end wall portion for facilitating transducing operations with said second tape player.

3. The apparatus set forth in claim 1 wherein said cassette has a pair of spools therein with the tape extending therebetween for enabling transducing operations, said first tape player for operating with said cassette and having a reel-to-reel transport for transporting tape at a relatively slow rate between said reels inside said cassette transducing operations within the cassette, and said second tape transport including buffer means into which said tape is partially removable and having a transducer adjacent said buffer means for transducing operations outside said cassette and further including reel drive means for rotating the reels in coordinated action with respect to tape being transported through said buffer means and past said transducer at a relatively fast rate.

4. The data processing system set forth in claim 3 further including in combination:

a remote CPU, a communication net for exchanging signals with said remote CPU and further exchanging signals with said first cassette player at a low given rate whereby signals may be exchanged with tape in said cassette at a relatively low rate, and a central CPU electrically connected to said second transport such that signals may be exchanged between said central CPU and tape in said cassette at a relatively high rate, whereby signals can be exchanged between said remote CPU and said central CPU via a single tape containing cassette insertable into and operable with both said first and second tape transports by first inserting one cassette in one of said tape transports performing transducing operations; then in another one of said tape transports and performing transducing operations.

5. A data processing system having first and second portions operable at different speeds, each portion having a tape transport capable of transporting tape at respective speeds corresponding to the performance requirements of said two portions, a cassette having a tape therein usable with either portion and when used with said first portion, capable of permitting tape transducing operations within the cassette and when used with said second portion, capable of permitting transducing operations on said tape external to the cassette, and means along a front wall portion of said cassette for selectively partially closing said front wall portion for permitting limited access to the cassette for in-the-cassette transducing operations with respect to said first data processing system portion and being completely openable for permitting removal of the tape in an unobstructed manner for facilitating out-of-cassette transducing operations with respect to said second date processing system portion.

6. The system set forth in claim 5 wherein said cassette includes a pair of tape guide members on opposite ends of said end wall portion with the internal tape path being in line between said guides and the tape path external to said cassette including tape passing on opposite outer sides of said tape guides.

7. A tape containing cassette for use in a data processing system having handlers of different tape transporting speeds, the cassette including:

tape holding means therein, the cassette having a pair of tape guides disposed at opposite ends of one end wall with a tape path being defined between said guides and extending along said one wall, and an aperture-forming removable closure mountable on said one end wall portion and cooperating with said guides for retaining the tape in the cassette for enabling tape transport entirely within the cassette at a relatively low speed by one of said handlers and, when removed, opening substantially all of said one end wall portion whereby said tape extending between said guides may be removed from the cassette for enabling tape transport including a tape path portion outside said cassette at a relatively high speed by a second one of said handlers and while said closure is on the end wall portion, access is permitted to the tape through said formed apertures whereby said one cassette facilitates data processing operations including tape transporting at substantially different rates.

8. The cassette set forth in claim 7 wherein said closure is hinged to said cassette for pivoting motion between opening and partially closing positions.

9. The method of exchanging data between a high-speed data processing network and a low-speed data processing network comprising taking a cassette having a magnetic tape therein for exchanging signals respectively with said networks and, when exchanging signals with the low-speed network, causing said tape to move entirely within the cassette for transducing operations therein and, when operating with said higher performance data processing network, partially removing the tape from the same cassette and causing transducing operations to be effected with the tape external to said cassette whereby the tape speed may be greatly increased over the tape speed of the internal transducing operations.

* * * * *

PO-1050
(5/69)

UNITED STATES PATENT OFFICE
CERTIFICATE OF CORRECTION

Patent No. 3,706,979 Dated December 19, 1972

Inventor(s) James M. Tagawa and Hui-Li Tiao

It is certified that error appears in the above-identified patent and that said Letters Patent are hereby corrected as shown below:

In the "Abstract", last line, change "aoutomatic" to --automatic--.

Column 5, line 10, after "tape" insert --path--.

Column 6, line 27, change "date" to --data--.

Signed and sealed this 15th day of May 1973.

(SEAL)
Attest:

EDWARD M.FLETCHER,JR.
Attesting Officer

ROBERT GOTTSCHALK
Commissioner of Patents